INVENTOR.
RALPH R. RANDALL
BY
Barnes, Kisselle, Laughlin & Raisch
ATTORNEYS

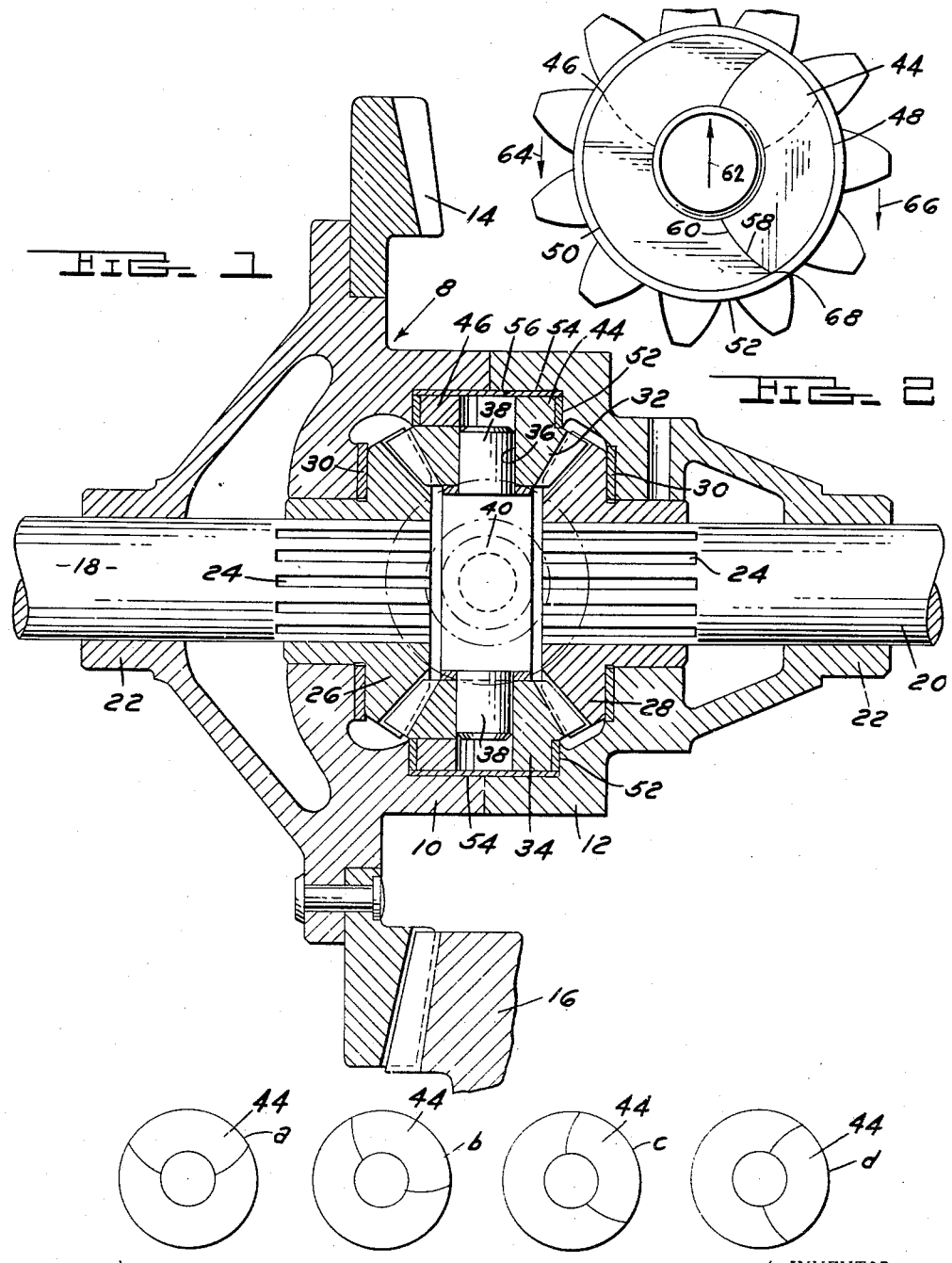

United States Patent Office 2,841,037
Patented July 1, 1958

2,841,037

DIFFERENTIAL MECHANISM

Ralph R. Randall, Freeport, Ill., assignor of one-fourth each to Francis S. Roach, Harold R. Nettles, and Leona P. Gassman Application March 16, 1956, Serial No. 571,992

18 Claims. (Cl. 74—711)

This invention relates to a differential mechanism of the type used in vehicle drives.

The conventional differential of the type ordinarily used in automobiles, for example, is a fairly efficient device for transmitting torque to the driven wheels of the vehicles as long as the driving wheels have equal traction. However, if one wheel is located in mud or on an icy surface and has considerably less traction than the other wheel, the greater portion of the power is delivered to the wheel having the least traction with the result that if the degree of traction between the two wheels varies considerably, the wheel having lesser traction will be caused to spin and not enough torque will be delivered to the other wheel to move the vehicle.

It is an object of the present invention to provide a differential mechanism which is of the non-locking type and which at the same time is designed to deliver a greater amount of torque to the wheel having the greater traction.

A further object of the invention is to provide a mechanism of the type described wherein the power division between the two driven wheels varies in substantially a direct ratio to the torque loading of the differential. That is to say, the torque delivered to the wheel having the greater traction increases generally in proportion to the torque on the axles of the differential.

A further object of the invention resides in the provision of a differential of the type described which maintains true differential action at all times, that is non-locking and at the same time, the action providing for the power division between the two driven wheels remains substantially constant regardless of the amount of wear on the component parts of the differential mechanism.

A further object of the invention resides in the provision of a differential of the type described which can be manufactured for substantially the same price as the conventional differential and which is interchangeable with conventional differentials presently used on automobiles and other vehicles.

Other features and advantages of the differential mechanism of the present invention will become apparent from the following description taken in conjunction with the drawings, in which:

Fig. 1 is a vertical sectional view through a differential mechanism according to the present invention.

Fig. 2 is a view showing in a generally diagrammatic way the action of component parts of the differential mechanism which accounts for the power division.

Figs. 3 shows in a diagrammatic way the staggering of the rotative position for component parts of the differential mechanism for producing a prolonged power division action in the differential mechanism of the present invention.

Figure 4:
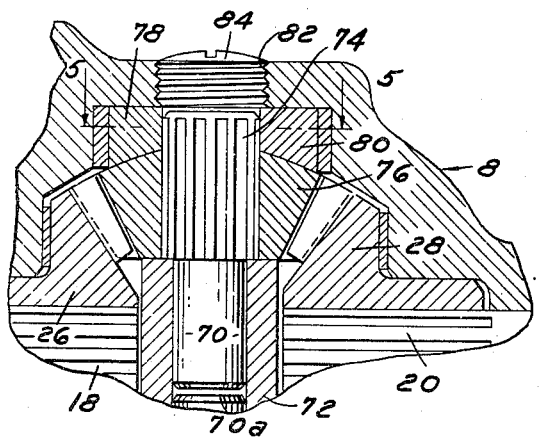
Fig. 4 is a fragmentary sectional view showing a modified construction of the differential mechanism of this invention.
Figure 5:
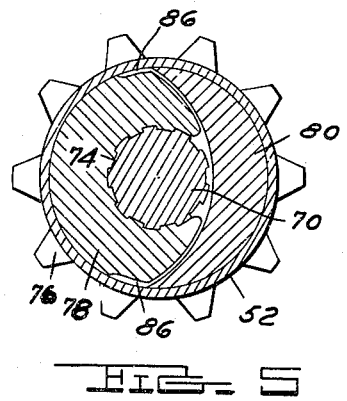
Fig. 5 is a sectional view taken along the lines 5—5 in Fig. 4.

In Fig. 1, there is illustrated a two-piece differential housing 8 comprising the sections 10 and 12 which, when assembled, are secured together by means of bolts or the like, not illustrated. The section 10 supports a ring gear 14 which is arranged to mesh with a pinion 16 at the end of the drive shaft of the vehicle, not shown. The axles for the two driving wheels are designated 18 and 20. These axles are journaled in aligned bearing portions 22, and the ends thereof within the differential housing are splined as at 24. On the splined ends 24 of axles 18 and 20, there are mounted bevel gears 26 and 28. Thrust bearings 30 are provided between the back faces of bevel gears 26 and 28 and the adjacent faces of the housing sections 10 and 12.

Between the bevel gears 26 and 28, there are arranged a plurality of pinions 32, 34 which mesh with bevel gears 26, 28. In the illustrated arrangement, pinions 32, 34 are diametrically opposed. Each pinion is provided with a socket 36 which receives the ends 38 of a pilot member 40 for holding the pinions in radial alignment. Each pinion 32, 34 is provided with an eccentric crank arm 44 which extends axially outwardly from the outer end face of the pinion. Associated with eccentric crank arm 44 of each pinion is a pilot bearing member 46. The outer peripheral surfaces of each crank arm 44 and pilot bearing 46, namely, the surfaces 48 and 50, respectively, cooperate to form a cylindrical extension of pinions 32, 34; and these cylindrical extensions are journalled in annular bearings 52 within cylindrical sockets 54 formed in housing 8. Bearings 52 and sockets 54 are concentric with the pitch diameter of pinions 32, 34, and the cylindrical extension provided by the eccentric crank arms 44 and the pilot bearings 46 is arranged to rotate freely in the annular bearings 52. In the arrangement shown in Fig. 1, the outer end faces of eccentric crank arms 44 and pilot bearings 46 are flat and a bearing disc 56 is arranged between these outer end faces and the base of socket 54.

Referring now to Fig. 2, it will be observed that the inner surface 58 of each crank arm 44 and the inner surface 60 of each pilot bearing 46 are in surface engagement. These surfaces are preferably formed as segments of a straight cylinder; that is, they are formed as circular arcs. In the arrangement shown in Fig. 2, the radius of the circle which defines the arc of surfaces 58 and 60 is substantially equal to the radius of the circle which defines the arc of surfaces 48 and 50. In order to obtain the full advantages of the present inventions, the outer surface 48 of crank arm 44 in bearing contact with bearing 52 has a circumferential extent of less than 180°, preferably within the range of 90° to 120°.

The operation of the arrangement shown in Figs. 1 and 2 may be briefly described as follows: Assuming that the vehicle is traveling forwardly and that the torque on the housing acting through the annular bearing 52 produces a force on the pinion 32 in the direction of the arrow 62, then the reaction forces on the pinion 32 by reason of the bevel gears 26 and 28 would be generally as indicated by the arrows 64 and 66. If the vehicle were traveling a straight path and the traction on both wheels was the same, then the eccentric crank arm 44 would tend to seek an equilibrium position; that is, the centrally disposed position shown in broken lines where it would be located on the leading side of pilot bearing 46. Now, if the wheel encountered a road surface condition where the wheel driven by axle 18 had considerably less traction than the wheel driven by axle 20, the wheel having the lesser traction would tend to travel faster and thereby rotate the pinion 32 illustrated in Fig. 2 in a clockwise direction, thus shifting the eccentric arm 44 from its equilibrium position laterally towards the wheel having the greater traction. As the crank arm 44 shifts from its equilibrium position to the position shown in solid lines in Fig. 2, it will be appreciated that the locus of application of the driving force on pinion 32 through eccentric crank arm 44 also shifts in a direction away from the wheel having the lesser traction towards the wheel having the greater traction. Thus, based on the lever action alone, the power will be unequally distributed between the two axles, the axle 20 in this case receiving a greater proportion of the torque.

However, there is another feature of the present arrangement which multiplies this power division to an even greater extent. As the eccentric crank arm 44 shifts from its equilibrium position to its laterally offset position at the right as shown in Fig. 2, it will be observed that the resultant reaction force on the pinion 32, the lever arm of the force at 64 being the greater, is such as to tend to cock the eccentric crank arm 44 counterclockwise. In view of the normal tolerances between the crank arm 44, the pilot bearing 46 and the annular bearing, which may be in the neighborhood of .010", the slight misalignment of eccentric crank arm 44 produces an angular cam pressure within the bearing 52 which materially increases the annular bearing pressure in the zone 68. This in turn results in a braking effect upon the turning moment of pinion 32. The net effect is that an even greater portion of the power is delivered to the wheel having the greater traction. As the driving torque on the pinion 32 increases, the unit pressure at the zone 68 will likewise increase; and thus, the power division between the two wheels varies in substantially a direct ratio to the torque loading of the differential. By delivering greater torque to the wheel having greater traction, the effect of the difference in traction is minimized and as long as the difference in traction is not too excessive, sufficient torque will be applied to the driving wheel having the greater traction to propel the vehicle. If the torque ratio required to prevent spinning of one wheel exceeds the lever arm ratio produced by crank arm 44 shifting to the laterally offset position, then pinion 32 will simply rotate at a constant velocity, delivering variable torque impulses to both wheels.

It will be appreciated that although the crank arm 44 produces in effect a wedging action, it does not lock. When the differential is operating under conditions of maximum power division, any differential action induced by one of the bevel gears 26, 28 turning in a reverse direction from the other bevel gear, immediately releases the camming action of crank arm 44 and permits the driving wheels to seek their own relative rolling motion as dictated by the ground speed.

If all the pinions 32, 34 are arranged within housing 8 with the eccentric crank arms 44 in the same relative position, the resulting power division will be quite cyclic in effect and of short duration. The effect of the eccentric leverage on the two bevel gears 26 and 28 which results in the delivery of greater power to the wheel having the greater traction can be prolonged by mounting the pinion gears 32, 34 in the housing 8 so that the crank arms 44 are progressively advanced circumferentially in relation to each other. Thus, as shown in Fig. 3, if four pinions 32, 34 were mounted in housing 8, each being spaced 90° apart circumferentially of bevel gears 26, 28, the crank arms 44 of these pinions could be progressively staggered circumferentially. For example, a first pinion designated a would be arranged with its crank arm 44 in the equilibrium position, the next pinion b advanced slightly from the position a, the third pinion c advanced slightly from the position b and the fourth pinion d with its crank arm 44 in the maximum eccentric position. With such an arrangement, the eccentric leverage on the two bevel gears 26 and 28 would be prolonged considerably as compared with a differential where the crank arms 44 of all the pinions are disposed in the same relative position.

The arrangement shown in Figs. 4 through 7 is generally the same as that shown in Figs. 1 and 2 with slight variations. In Fig. 4, the pilot member 70 within the bearing sleeve 72 is provided with a splined axial extension 74. Pinion 76 and eccentric crank arm 78 are formed as independent members each having a splined connection with the splined portion 74 of pilot 70. The outer end face of pinion 76 and the inner faces of crank arm 78 and pilot bearing 80 are formed as mating spherical surfaces. To facilitate assembly, the housing 8 is provided with a threaded opening 82 through which the pilot member 70 may be inserted. A screw plug 84 is provided for closing opening 82. In this arrangement, it will be appreciated that since the pilot 70 has a splined connection with pinion 76, the pinion diametrically opposed to pinion 76 has its own pilot 70a of similar construction but rotatable relative to the pilot 70. In the arrangement shown in Figs. 4 and 5, the crank arm 78 is substantially larger than the pilot bearing 80 in comparison with the crank arm 44 of the embodiment illustrated in Figs. 1 and 2. Thus, in this arrangement, in order to obtain the desirable annular cam pressure between the eccentric crank arm 78 and the annular bearing 52, the outer surface of crank arm 78 is relieved as at 86 so that the effective annular bearing surface of crank arm 78 is less than 180°.

Figure 6:
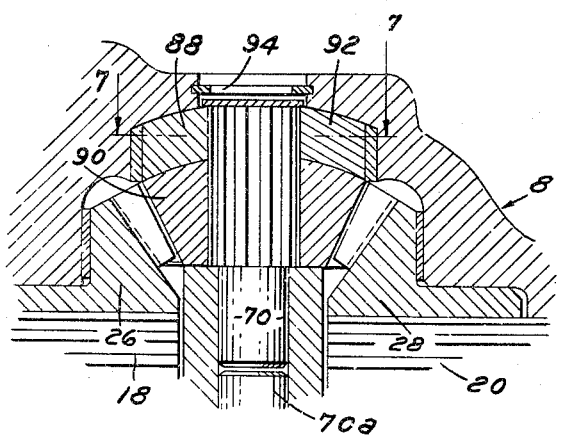
Fig. 6 is a second modified construction of a differential mechanism according to the present invention.
Figure 7:
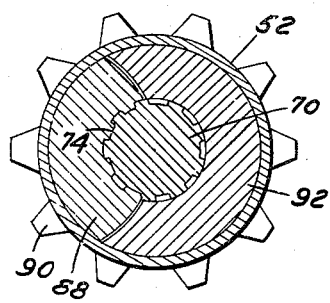
Fig. 7 is a sectional view taken along the lines 7—7 in Fig. 6.

In the arrangement shown in Figs. 6 and 7, the crank arm 88 and the pinion 90 have a splined connection with the pilot 70. However, in this arrangement, both the inner and outer end surfaces of crank arm 88 and pilot bearing 92 are spherically shaped and a snap ring 94 is employed for retaining the pilots 70 and 70a in their assembled condition.

Thus, it will be seen that I have provided a differential mechanism which is of the non-locking type and provides a very efficient power division to the two driving wheels proportioned such that the wheel having the greater traction will receive the greater proportion of the power. With reference to the housing structure itself, it will be observed that the mechanism is not substantially different from the conventional differential housing both from the standpoint of size and shape. This accounts for the fact that the differential mechanism according to the present invention can be manufactured economically and for substantially the same cost as a conventional differential. The present mechanism thus also provides a unit which is interchangeable with the conventional differential which is already installed on a vehicle. Furthermore, it will be noted that since the power distribution obtained with this arrangement depends in part upon the tendency to produce misalignment of crank arm 44, the normal wear which the component parts are subjected to has substantially no effect on the power division obtained.

I claim:

1. A differential mechanism comprising a rotatable housing forming a driving member, a pair of spaced apart axially aligned bevel gears mounted within said housing at the axis of rotation of the housing, a plurality of pinion gears arranged between and meshing with said bevel gears, said pinion gears each having an eccentric crank arm associated therewith and projecting in a direction radially outwardly of the housing, said housing having a cylindrical bearing socket disposed radially outwardly of and in axial alignment with each of said pinion gears, said sockets being concentric with the pitch diameter of the adjacent pinion gear, said eccentric crank arm projecting into said bearing socket, a pilot bearing in said bearing socket, said pilot bearing and said eccentric crank arm having outer surfaces which cooperate to form a circular bearing surface disposed concentrically within said bearing socket, said pilot bearing and said eccentric crank arm having complementary inner abutting curved surfaces, said bearing surface having a diameter slightly less than the diameter of said bearing socket whereby said crank arm is permitted to rock slightly within said bearing socket.

2. A differential mechanism as called for in claim 1 including an annular bearing seated within said socket and in which said pilot bearing and eccentric crank arm are journalled for rotation as a unit.

3. A differential mechanism as called for in claim 1 wherein the outer surface of said pilot bearing has a greater circumferential extent than said crank arm.

4. A differential mechanism as called for in claim 1 including means interconnecting the pinion gears for maintaining them in radially aligned position.

5. A differential mechanism comprising a rotatable housing providing a driving member, a pair of spaced apart axially aligned bevel gears journalled in said housing on its axis of rotation, a plurailty of pinion gears arranged circumferentially about said bevel gears, said pinion gears meshing with said bevel gears, said pinion gears being at least two in number which are diametrically opposed, means including axial shafts extending radially inwardly from said two pinion gears to maintain the pinion gears in radial alignment, an eccentric crank arm projecting radially outwardly from radially outer faces of the two pinion gears, each of said crank arms being rotatably fixed relative to its associated pinion gear, each crank arm having an outer surface forming a segment of a circle generally concentric with the pitch diameter of the pinion gear and having a convex inner surface forming a segment of another circle, a pilot bearing of generally crescent shape and having an inner concave surface in surface engagement with the inner surface of said crank arm, said pilot bearing having an outer surface forming a segment of said first mentioned circle, said housing having a plurality of regularly spaced sockets therein in which the crank arms and the associated pilot bearings are journalled for rotation, there being slight clearance between the outer surfaces of said crank arm and pilot bearing and the inner surface of said bearing socket sufficient to permit said crank arm to assume a slightly cocked position within said bearing socket.

6. A differential mechanism as called for in claim 5 wherein the portion of the outer surface of said crank arm in bearing engagement with said socket has a circumferential extent of less than 180°.

7. A differential mechanism as called for in claim 5 including an annular bearing in each of said sockets extending circumferentially around said pilot bearing and crank arm with a free rotating fit.

8. A differential mechanism as called for in claim 5 wherein said crank arms are formed integrally with said pinion gears.

9. A differential mechanism as called for in claim 5 wherein each crank arm comprises a member positioned adjacent the outer end face of the associated pinion gear and has a driving connection therewith.

10. A differential mechanism as called for in claim 9 wherein each pinion gear and crank arm are provided with internally splined portions and including a spline member interconnecting said pinion gear and crank arm at said splined portions.

11. A differential mechanism comprising a rotatable housing forming a driving member, a pair of spaced apart axially aligned bevel gears mounted within said housing at the axis of rotation of the housing, a plurality of pinion gears arranged between and meshing with said bevel gears, said pinion gears each having an eccentric crank arm associated therewith and projecting in a direction radially of the housing, a pilot bearing associated with each of said eccentric crank arms, each of said pilot bearings and the associated crank arm having outer surfaces cooperating to form a generally cylindrical bearing surface, generally concentric with the pitch diameter of the pinion gear, said housing having a cylindrical bearing socket therein in which said pilot bearing and said eccentric crank arm are rotatably journalled with slight clearance, said pilot bearings and said eccentric crank arms having inner abutting surfaces in generally surface engagement, said inner surfaces generally forming segments of a circle.

12. A differential mechanism as called for in claim 11 wherein said eccentric crank arm extends radially inwardly of the bearing socket beyond the axis of said pinion gear and the outer surface of said crank arm adjacent its opposite ends being relieved so that the portion of said outer surface of said crank arm engaging with said cylindrical bearing socket has a circumferential extent of substantially less than 180°.

13. A differential mechanism as called for in claim 11 wherein the inner surface of each eccentric crank arm is convex and the inner surface of each pilot bearing is concave.

14. A differential mechanism as called for in claim 13 wherein the outer surface of each eccentric crank arm engaged with said cylindrical bearing socket has a circumferential extent of less than 180°.

15. A differential mechanism as called for in claim 14 wherein the radius defining the inner surfaces of said crank arm and pilot bearing is at least as great as the radius of said bearing socket.

16. A differential mechanism comprising a rotatable housing forming a driving member, a pair of spaced apart axially aligned bevel gears mounted within said housing at the axis of rotation of the housing, a plurality of pinion gears arranged between and meshing with said bevel gears, said pinion gears each having an eccentric crank arm associated therewith and projecting in a direction radially of the housing, said eccentric crank arms each having a driving connection with its associated pinion gear, said housing having an annular bearing socket disposed radially outwardly of and in axial alignment with each of said pinion gears, said sockets being concentric with the pitch diameter of the adjacent pinion gear, said eccentric crank arm projecting into said bearing socket, a pilot bearing in said bearing socket, said pilot bearing and said eccentric crank arm having outer surfaces which cooperate to form a generally circular bearing surface disposed concentrically with said bearing socket, said pilot bearing and said eccentric crank arm having complementary inner abutting curved surfaces, the crank arm on one of said pinion gears being offset circumferentially relatively to the crank arm on another of said pinion gears, there being slight clearance between said generally circular bearing surface and said bearing socket to permit said crank arm to assume a slightly cocked position in said bearing socket.

17. A differential mechanism as called for in claim 16 wherein said pinion gears comprise at least three in number, the crank arm associated with each pinion gear being offset circumferentially relative to the crank arm associated with the next adjacent gear.

18. A differential mechanism as called for in claim 16 wherein the crank arms associated with said pinion gears are offset circumferentially successive amounts.

References Cited in the file of this patent

UNITED STATES PATENTS

| | | |
|---|---|---|
| 1,948,095 | Boyton | Feb. 20, 1934 |
| 2,392,441 | Wildhaber | Jan. 8, 1946 |

FOREIGN PATENTS

| | | |
|---|---|---|
| 738,957 | Germany | Sept. 6, 1943 |